US007239928B2

(12) United States Patent
Kohl et al.

(10) Patent No.: US 7,239,928 B2
(45) Date of Patent: Jul. 3, 2007

(54) METHOD FOR PRODUCING AN ITEM LIST

(75) Inventors: Gerhard Kohl, Neunkirchen am Brand (DE); Quirin Spreiter, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 758 days.

(21) Appl. No.: 10/165,895

(22) Filed: Jun. 10, 2002

(65) Prior Publication Data

US 2003/0002618 A1     Jan. 2, 2003

(30) Foreign Application Priority Data

Jun. 12, 2001 (DE) ............................. 101 28 450

(51) Int. Cl.
G06F 19/00 (2006.01)
(52) U.S. Cl. ................... 700/95; 705/29; 700/97; 700/99; 700/106; 700/115
(58) Field of Classification Search ............... 705/28, 705/29, 1; 707/3, 10, 104.1; 709/217, 201; 709/203; 700/95, 97, 106, 109, 110, 115, 700/116, 117, 99; 715/500; 378/19, 207, 378/4
See application file for complete search history.

(56) References Cited

U.S. PATENT DOCUMENTS

| | | | |
|---|---|---|---|
| 5,777,876 A * | 7/1998 | Beauchesne ................... 700/95 |
| 5,864,875 A * | 1/1999 | Van Huben et al. ........ 707/200 |
| 5,886,359 A * | 3/1999 | Bringley et al. ............ 250/580 |
| 6,002,650 A * | 12/1999 | Kuribayashi et al. ........ 700/117 |
| 6,128,626 A | 10/2000 | Beauchesne |
| 6,137,859 A * | 10/2000 | Von Der Haar et al. ...... 378/19 |
| 6,175,611 B1 * | 1/2001 | Melen et al. .................. 378/19 |
| 6,334,115 B1 * | 12/2001 | Kuribayashi et al. ......... 705/27 |
| 6,335,528 B1 * | 1/2002 | Vieux et al. ........... 250/370.11 |
| 6,381,509 B1 * | 4/2002 | Thiel et al. .................. 700/115 |
| 6,415,193 B1 * | 7/2002 | Betawar et al. ............... 700/97 |
| 6,480,846 B2 * | 11/2002 | Kuribayashi et al. .......... 707/6 |
| 6,493,679 B1 * | 12/2002 | Rappaport et al. ............ 705/29 |
| 6,748,286 B1 * | 6/2004 | Losch ......................... 700/97 |
| 6,819,965 B2 * | 11/2004 | Beatty et al. ................. 700/97 |
| 6,834,370 B1 * | 12/2004 | Brandl et al. ................ 715/500 |
| 6,904,332 B2 * | 6/2005 | Lingua et al. .............. 700/157 |
| 6,915,174 B2 * | 7/2005 | Dinges et al. ................ 700/83 |
| 6,957,186 B1 * | 10/2005 | Guheen et al. ................. 705/1 |

FOREIGN PATENT DOCUMENTS

| | | |
|---|---|---|
| DE | 199 26 206 | 1/2001 |
| EP | 982602 A2 * | 3/2000 |
| JP | 11344569 A * | 12/1999 |

* cited by examiner

*Primary Examiner*—Florian R. Zeender
*Assistant Examiner*—Luna Champagne
(74) *Attorney, Agent, or Firm*—Schiff Hardin LLP

(57) ABSTRACT

In a method for producing an item list of components for the assembly of a module including the components at a first location, wherein the components can be taken from a number of offered components, the offered components are provided with a reference number and are accessible from the first location, and at least one individual property of each component is stored together with its reference number in a databank that is arranged at a second location different from the first location.

6 Claims, 4 Drawing Sheets

| Item list for a Type A Radiation detector ||
| --- | --- |
| Installed position | Reference number of the detector module |
| 1 | 3 A 12 |
| 2 | 3 B 14 |
| 3 | 3 D 12 |
| 4 | 3 H 13 |
| 5 | 5 C 15 |
| 6 | 7 H 17 |
| 7 | 2 C 12 |
| 8 | 1 Z 13 |
| 9 | 3 C 15 |
| 10 | 4 C 02 |
| 11 | 3 H 01 |
| 12 | 2 K 05 |
| 13 | 4 T 07 |
| 14 | 3 H 15 |
| 15 | 4 Z 17 |
| 16 | 5 K 15 |
| 17 | 7 A 17 |
| 18 | 3 B 13 |
| 19 | 4 K 12 |
| 20 | 5 L 11 |
| 21 | 3 K 10 |
| 22 | 4 A 07 |
| 23 | 7 H 06 |
| 24 | 8 B 05 |
| 25 | 9 Z 01 |
| 26 | 7 C 12 |

FIG 4

METHOD FOR PRODUCING AN ITEM LIST

BACKGROUND OF THE INVENTION

1. Field of the Invention

The present invention is directed to a method for producing an item list of components for the assembly into a module.

2. Description of the Prior Art

A module of the above type is, for example, a radiation detector of a computed tomography apparatus that has a number of identical detector modules as components. Each detector module in turn comprises a plurality of detector elements. The image-relevant physical properties of such detector elements, however, vary from detector module to detector module dependent on manufacture. In order to obtain a good image quality for CT images produced with the radiation detector, only detector modules whose image-relevant physical properties are matched optimally well to one another can be employed for the assembly of the radiation detector. For example, the image-relevant physical properties of the detector modules can be measured by the manufacturer before the detector modules are warehoused, the detector modules can be provided with a reference number and this information can be stored in a data bank.

When the manufacturer of the detector modules intends to assemble a radiation detector from the detector modules, for example, the manufacturer can determine suitable detector modules and their installation position with a method disclosed in German PS 198 11 044 corresponding to U.S. Pat. No. 6,137,859. This method is based on the image-relevant physical properties of the detector modules that have been measured and stored being used in an automated manner with a computer program stored in a computer to select modules for assembling the detector.

When the manufacturer of the detector modules supplies detector modules to further manufacturers of radiation detectors who assemble radiation detectors from the delivered detector modules and would like to employ the physical properties of the detector modules measured by the manufacturer of the detector modules and the aforementioned computer program for determining suitable detector modules and their installation positions, the manufacturer of the detector modules must supply the further manufacturer of radiation detectors with the measured, image-relevant physical properties of the detector modules and with the computer program. The further manufacturers of radiation detectors then can install this computer program on their own computers and employ it. A disadvantage of this procedure, however, is that the computer program would have to be adapted to the conditions at the further manufacturers. Such an adaptation of the computer program is relatively complicated.

SUMMARY OF THE INVENTION

It is therefore an object of the present invention to provide a method that allows for a facilitated assembly of the module from the components.

This object is achieved in accordance with the invention in a method for producing an item list of components for the assembly of a module including the components at a first location, wherein the components can be taken from a number of offered components, the offered components being provided with a reference number and being accessible from the first location, and wherein at least one individual property of each component is stored together with its reference number in a databank that is arranged at a second location different from the first location, including the following method steps:

a) Generating an inquiry for producing the item list from the first location;

b) Communicating the inquiry from the first location to the second location;

c) Based on the inquiry and on the properties and reference numbers of the components stored in the databank, producing the item list at the second location, the item list includes an indicator for a property of each component correlated with the reference numbers for that component; and d) Communicating the item list from the second location to the first location.

An item list of components is required at the first location since the module is to be assembled thereat. Data needed for producing the item list, i.e. the individual property of each component accessible at the first location stored in the databank, however, are available only at the second location. The individual property can, for example, be an image-relevant physical property of a detector module when a radiation detector is to be assembled.

After the information to the effect that an item list is required has been communicated to the second location, the item list is produced at the second location on the basis of the information stored in the databank. The item list, which includes a particular about the components to be employed together with their reference numbers, is subsequently transmitted from the second location to the first location.

Consequently, it is possible, based on information that is accessible only at the second location, to produce an item list of components that is required at another location, namely at the first location. The module can be assembled at the first location on the basis of this item list.

One advantage of this method is that the databank is arranged at a central location, i.e., the second location. This is especially advantageous when modules are to be assembled from the components at different first locations. The databank must then be implemented such that it takes only those components into consideration for producing the item list for a specific first location that are also accessible from this first location at which the module is to be assembled. The databank thus can be centrally maintained.

In a preferred embodiment of the invention, the assembly of the module is followed by a final check at the first location, and the data allocated to the final check are communicated from the first location to the second location. Faulty component parts are recognized as faulty at the second location on the basis of the communicated data A suitable component as a replacement for a faulty component is determined from the number of components that are still available taking the property stored in the databank into consideration, and the reference number of the identified component is communicated from the second location to the first location. The final check is thus implemented at the first location but the evaluation thereof is implemented at the second location. If components are faulty, this is recognized at the second location; since the information about the components that are still available for selection and about their individual properties are also available there, a replacement for the faulty component can be identified at the second location. Subsequently, the reference number of the replacement is communicated from the second location to the first location, so that the faulty component can be replaced by a suitable component at the first location.

The inquiry and the item list in one version of the invention are communicated via an information transmission network. According to one embodiment of the invention, the information transmission network can be the Internet or an Intranet.

According to a preferred version of the invention, the item list is produced by the manufacturer of the components. The manufacturer of the components thus can offer the production of the item list as a service and can thereby enhance the attractiveness of the components from that manufacturer.

In a further embodiment of the invention the components are detector modules and the module is a radiation detector of a computed tomography apparatus. According to one version of the invention, further, the individual property of the detector module is an image-relevant physical property of the detector module, and the item list also includes a particular about an installation position of the detector module in the radiation detector.

An especially high image quality of CT images produced with the radiation detector can be achieved when, according to a further embodiment of the invention, the components and their installed positions in the radiation detector are determined at the second location on the basis of a computer program. This computer program can, in particular, be based on the method disclosed in the aforementioned German PS 198 11 044.

DESCRIPTION OF THE DRAWINGS

FIG. 4 illustrates an item list produced by the inventive method.

DESCRIPTION OF THE PREFERRED EMBODIMENTS

Figure 1:
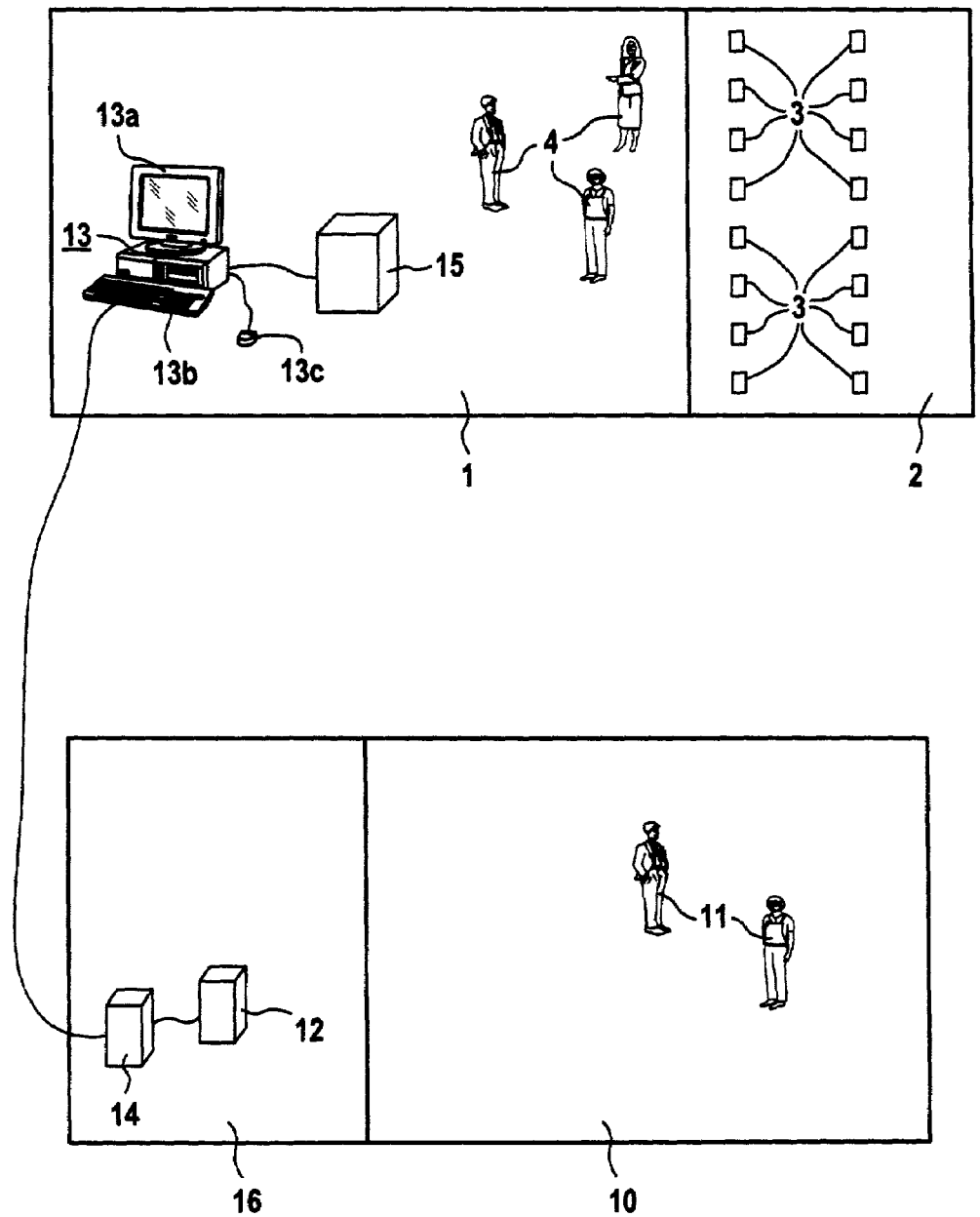
FIG. 1 schematically illustrates an assembly floor of a manufacturer of radiation detectors.

FIG. 1 shows an assembly floor 1 with connected warehouse 2 of a manufacturer of radiation detectors. In the case of the present embodiment, approximately 200 detector modules 3 formed by detector elements are stored in the warehouse 2. Employees 4 of the manufacturer of radiation detectors are capable of assembling radiation detectors from the detector modules 3 therefrom. In the exemplary embodiment, the manufacturer manufactures radiation detectors that have either 26 detector modules 3 (Type A), 42 detector modules 3 (Type B) or 48 detector modules 3 (Type C). The radiation detectors of the Type A, B and C thus mainly differ in terms of the number of detector modules 3 employed.

In the exemplary embodiment, the detector modules 3 are fabricated by a supplier in the supplier's factories 10 and are supplied to the manufacturer of radiation detectors. Due to manufacturing tolerances, the detector elements 3 fabricated by the supplier differ slightly in terms of their image-relevant physical properties. So that the manufacturer of radiation detectors can assemble a radiation detector from the detector elements 3 with which the manufacturer has been supplied, the radiation detector being suitable for producing CD images of high image quality, the detector modules 3 employed for the assembled radiation detector must match one another with respect to the image-relevant physical properties. Employees 11 of the supplier therefore determine image-relevant physical properties of each and every detector module 3 after the manufacture and before the delivery of the detector elements 3 to the manufacturer of radiation detectors, provide it with its reference number and store the reference number together with the physical properties of the corresponding detector module 3 in a databank 12 that is located in a business office 16 of the supplier.

In the exemplary embodiment, the employees 4 of the manufacturer of radiation detectors wish to assemble a radiation detector of the type A, i.e. a radiation detector comprising 26 detector modules 3. A radiation detector of the type A is shown as an example schematically in FIG. 2.

Figure 2:
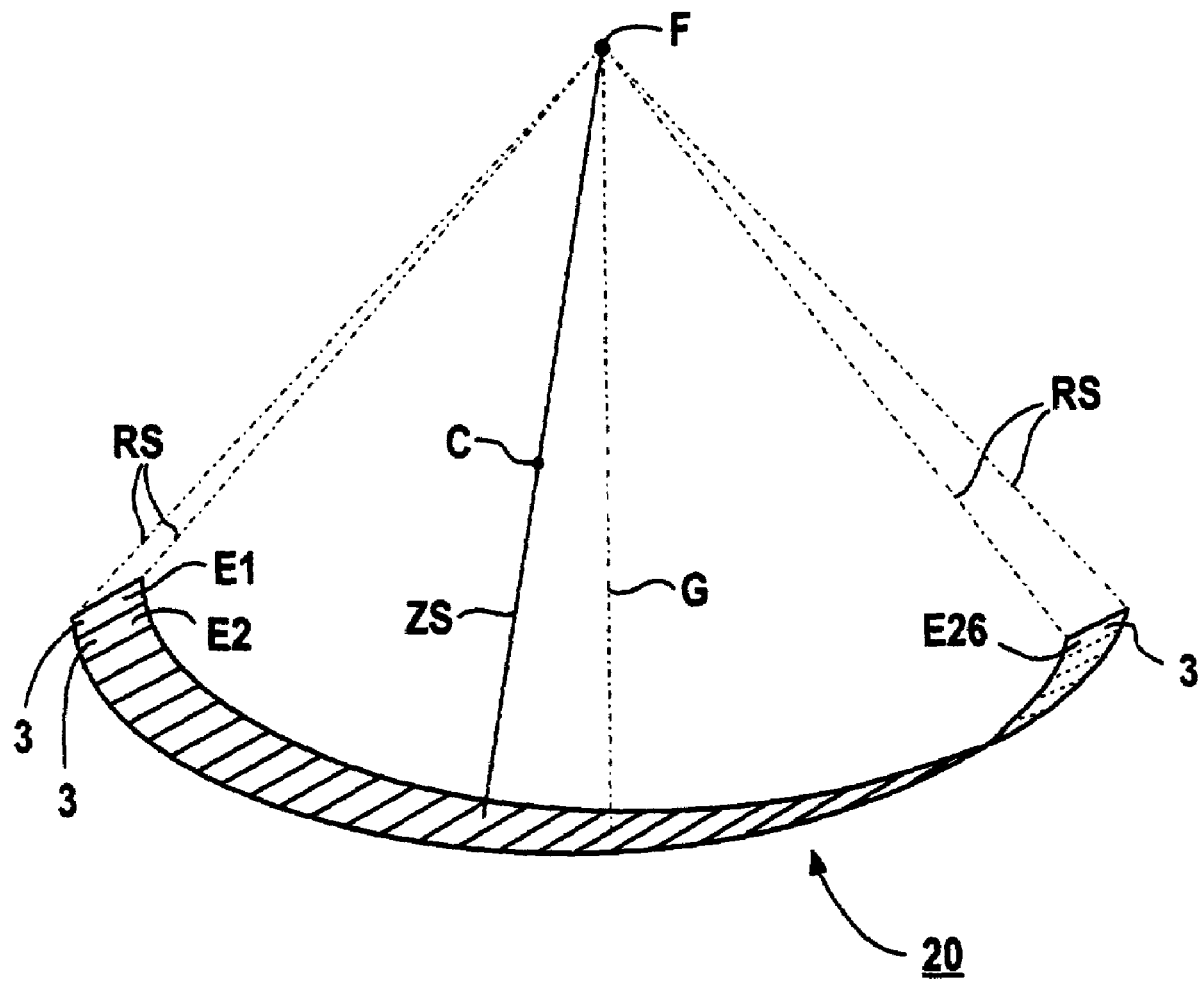
FIG. 2 illustrates a radiation detector assembled using the inventive method.

The radiation detector 20 shown in FIG. 2 is employed, for example, in computed tomography apparatus of the third generation. The radiation detector 20 has a curved arrangement of—in the present exemplary embodiment—26 detector modules 3 having the installed positions E1 through E26 that are arranged such that they are impacted by an x-ray beam that emanates from the focus F of an x-ray source (not shown) and that is gated fan-shaped and whose edge rays are referenced RS.

The central ray of the fan-shaped x-ray beam ZS—in a way that is standard in modern computed tomography systems—is not identical with the connecting straight line (referenced G) between the detector middle and the focus F, but is offset relative to this connecting straight line G.

The point C around which the radiation detector 20 and the x-ray source rotate in a known way during operation of the computed tomography apparatus lies on the central ray ZS.

Before the employees 4 of the manufacturer of radiation detectors assemble the radiation detector 20 shown in FIG. 2, they need an item list with which 26 suitable detector modules 3 can be selected from the warehouse 2 for the assembly of the radiation detector 20. In order to obtain the item list, they use a computer 13 situated in the assembly floor 1 and connected to the Internet, the computer 13 having a monitor 13a, a keyboard 13b and a computer mouse 13c, to contact an Internet server 14 that is located in the business office 16 of the supplier in the exemplary embodiment.

In the exemplary embodiment, the Internet browser Netscape® is stored in the computer 13. After the employees 4 of the manufacturer of radiation detectors have called the Internet browser Netscape® with the computer 13, have contacted the Internet server 14 of the supplier with an Internet address allocated to the Internet server 14, and have verified their access authorization by means of an identifier allocated to the manufacturer of radiation detectors, an Internet page 30 shown in FIG. 3 is built up on the monitor 13a.

Figure 3:
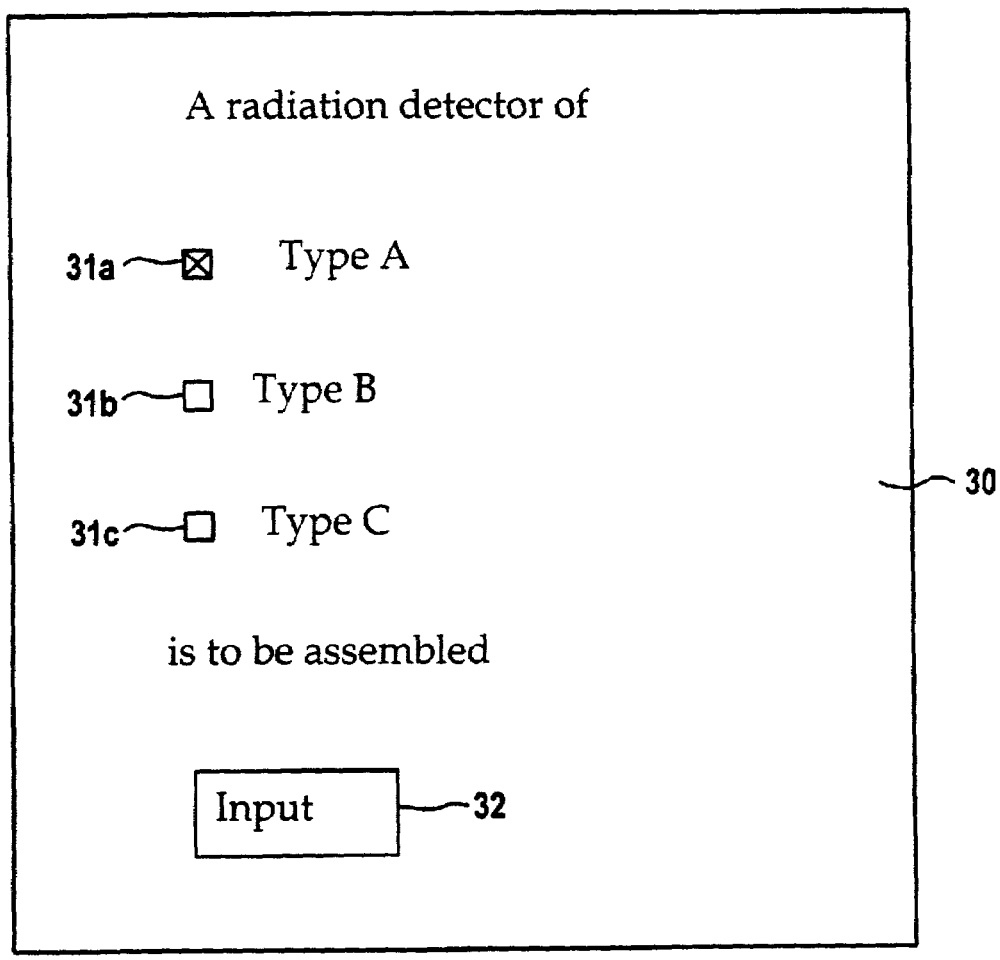
FIG. 3 illustrates an Internet page suitable for use in the inventive method.

Using the Internet page 30, the employees 4 of the manufacturer of radiation detectors can decide whether they wish to assemble a radiation detector of the type A, B or C in that using a mark that is not shown in FIG. 3 but is well-known and can be mixed into the Internet page 30 and moved with the computer mouse 13c, they provide a box 31a 31b or 31c allocated to the words Type A, Type B or Type C of the Internet page 30 with an x. Since the employees 4 of the manufacturer of radiation detectors given the present exemplary embodiment wish to assemble a radiation detector of the type A, they provide the box 31a with an x. Subsequently, they click the field 32 that is provided with the word "input" with the computer mouse 13c. Subsequently, the information that the employees 4 of the manufacturer of radiation detectors wish to assemble a radiation detector 20 of the type A from the detector modules 3 stored in the warehouse 2 is communicated to the Internet server 14 of the supplier.

In the case of the present exemplary embodiment, a computer program is stored in the Internet server 14 that, moreover, is connected to the databank 12, the computer program (based on the method disclosed in German OS 198 11 044) determines detector modules 3 located in the warehouse 2 and suitable for the assembly of the radiation detector 20 based on the inquiry of the employees 4 of the manufacturer of radiation detectors and based on the image-relevant physical properties of the detector modules 3 supplied to the manufacturer of radiation detectors that are stored in the databank 12. In addition to the suitable detector modules 3, the computer program stored in the Internet server 14 also determines the corresponding installed positions E1 through E26 of the radiation detector 24 the identified detector modules 3.

After the computer program has determined the detector modules 3, their reference numbers and the corresponding installed positions E1 through E26, the computer program generates an item list 40 shown in FIG. 4 that is communicated from the Internet server to the computer 13. Subsequently, an Internet page 41 that comprises the item list 40 and that is shown in FIG. 4 is built up on the monitor 13a.

The item list 40 has two columns 42 and 43. The column 42 includes a particular about the installed positions E1 through E26 of the detector modules 3 identified by the computer program of the Internet server 14, and the column 43 comprises a particular about the corresponding reference numbers of the identified detector modules 3. Subsequently, the employees 4 of the manufacturer of radiation detectors can get the corresponding detector modules 3 from the warehouse 2 and assemble the radiation detector 20.

After the employees 4 of the manufacturer of radiation detectors have assembled the radiation detector 20, they check the correct functioning of the radiation detector 20 with a monitoring device 15 shown in FIG. 1 that is connected to the computer 13. The data acquired during the check of the radiation detector 20 are communicated after the end of the check event to the Internet server 14 of the supplier with the computer 13 via the Internet, the Internet server 14 recognizing incorrectly installed detector modules 3 in an automated fashion by means of a computer program stored in the Internet server 14. Subsequently, the computer program determines a replacement for the faulty detector modules 3 based on the faulty detector modules 3, their installed positions and their image-relevant physical properties stored in the databank 12 and based on the other detector modules 3 installed in the radiation detector 20 and on the detector modules 3 that are still available in the warehouse 2.

Subsequently, the computer program stored in the Internet server 14 generates an e-mail that is sent to the computer 13 and contains a particular about the faulty detector modules 3, their installed positions and their replacements including reference numbers. If none of the detector modules 3 installed in the radiation detector 20 are faulty, the Internet server 14 automatically generates an email having a particular to the effect that the assembled radiation detector 20 is fault-free and sends this e-mail to the computer 13.

A final check of the radiation detector 20, moreover is optional for the inventive method. Instead of detector modules 3, individual detector elements can also be employed for the assembly of a radiation detector. The radiation detector 20 need not necessarily be a single-line radiation detector.

The inventive method is not limited to the assembly of a radiation detector. It can also be employed for the assembly of other modules, whereby the components needed for the assembly of the module need not necessarily be detector modules.

The image-relevant physical properties of the detector modules 3 stored in the databank 12 are only an example of an individual property of a component.

The databank 12 also need not necessarily be operated by the manufacturer of the detector modules 3. It is also not compulsory that the Internet be employed as information transmission network. In particular, an Intranet can also be employed.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for producing an item list of components for assembling a radiation detector for a computed tomography apparatus, comprising the steps of:

at a first location, providing an inventory of detector modules that are accessible at said first location for assembly at said first location to form a radiation detector for a computed tomography apparatus, and electronically assigning a reference number to each of said detector modules, said detector modules being accessible from said first location;

electronically storing the respective reference numbers of said detector modules together with at least one individual image-relevant property of each of said detector modules in an electronic databank disposed at a second location which is different from said first location;

electronically generating an inquiry at said first location for an item list comprising detector modules from among said detector modules at said first location;

electronically communicating said inquiry from said first location to said second location via an information transmission network;

dependent on said inquiry and dependent on the respective individual image-relevant properties and reference numbers of the detector modules stored in said databank, electronically compiling an electronically represented compiled item list at said second location, said compiled item list including designation of each detector module in the compiled item list by the respective reference numbers thereof, together with a designation of the image-relevant property of each detector module in said compiled item list and a designation for each detector module in said compiled item list of a position at which each detector module in said compiled item list should be installed in said radiation detector that is to be assembled; and electronically communicating said electronically represented compiled item list from said second location to said first location via said network.

2. A method as claimed in claim 1 comprising the additional steps of:

assembling said radiation detector at said first location based on the image-relevant property of the respective detector modules in said compiled item list to produce an assembled radiation detector;

checking the detector modules comprising said assembled radiation detector at said first location as to operability to obtain electronically represented check data respectively allocated to the components in the assembled radiation detector;

electronically transmitting said electronically represented check data to said second location via said network and identifying faulty detector modules, among the detector modules in said assembled radiation detector, at said second location dependent on said electronically represented check data;

at said second location, identifying respective replacement detector modules for each detector module identified as faulty in said assembled radiation detector, from the detector modules still available in said inventory, using said image-relevant property stored in said databank; and at said second location, identifying respective numbers for said replacement detector modules and communicating an electronic representation of the reference numbers together with the respective positions of said faulty detector modules in the assembled radiation detector from said second location to said first location.

3. A method as claimed in claim 1 comprising electronically producing said electronically represented item list at a manufacturer of said detector modules.

4. A method as claimed in claim 1 comprising determining the respective positions of said detector modules in said compiled list using a computer program executed at said second location.

5. A method as claimed in claim 1 comprising employing the Internet as said information transmission network.

6. A method as claimed in claim 1 comprising employing an Intranet as said information transmission network.

* * * * *